(12) United States Patent
Kovac

(10) Patent No.: US 7,059,392 B2
(45) Date of Patent: Jun. 13, 2006

(54) RADIATOR ATTACHMENT ASSEMBLIES, APPARATUS COMPONENTS, AND METHODS

(75) Inventor: Zdravko Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/873,195

(22) Filed: Jun. 23, 2004

(65) Prior Publication Data

US 2005/0006071 A1    Jan. 13, 2005

Related U.S. Application Data

(60) Provisional application No. 60/486,175, filed on Jul. 11, 2003.

(51) Int. Cl.
*F28D 7/00*    (2006.01)
*F16B 21/00*    (2006.01)

(52) U.S. Cl. .................. 165/140; 165/76; 411/526

(58) Field of Classification Search ............... 165/140, 165/67, 76; 411/356, 519, 512, 525, 526, 411/528
See application file for complete search history.

(56) References Cited

U.S. PATENT DOCUMENTS

| | | | |
|---|---|---|---|
| 2,741,938 A | | 4/1956 | Johnson |
| 3,007,726 A | * | 11/1961 | Parkin ........................ 411/516 |
| 3,297,080 A | * | 1/1967 | Williams et al. ............. 165/77 |
| 3,938,587 A | * | 2/1976 | Vian ........................... 165/76 |
| 4,463,800 A | * | 8/1984 | Hadden ....................... 165/76 |
| 4,541,602 A | * | 9/1985 | Potzas ......................... 248/544 |
| 4,728,236 A | * | 3/1988 | Kraus ......................... 411/437 |
| 5,098,242 A | * | 3/1992 | Schaty ....................... 411/437 |
| 5,297,322 A | * | 3/1994 | Kraus ......................... 411/512 |
| 5,628,096 A | * | 5/1997 | Watters et al. ............. 24/590.1 |
| 6,158,500 A | | 12/2000 | Heine .......................... 165/67 |
| 6,202,737 B1 | | 3/2001 | Mahe ......................... 165/67 |
| 6,315,034 B1 | | 11/2001 | Mahe et al. ................. 165/121 |
| 6,361,261 B1 | * | 3/2002 | Gattone et al. ............. 411/526 |
| 6,368,319 B1 | * | 4/2002 | Schaefer ..................... 411/412 |
| 6,371,419 B1 | * | 4/2002 | Ohnuki ...................... 248/74.2 |
| 6,382,312 B1 | * | 5/2002 | Avequin et al. ............. 165/140 |
| 6,598,836 B1 | * | 7/2003 | Leon .......................... 411/433 |

FOREIGN PATENT DOCUMENTS

GB    974567    11/1964
WO    03/069251    8/2003

* cited by examiner

*Primary Examiner*—Teresa J. Walberg
(74) *Attorney, Agent, or Firm*—Miles & Stockbridge P.C.

(57) ABSTRACT

A first device is attached to a second device, particularly first and second radiators, using a retainer and a cooperable button. The retainer has a base and a stem projecting from one side thereof with an elongated ratchet for engaging at least one pawl in an axial opening of the button. The button, preferably a single piece, has a hub with an axial opening in which the pawl is located and has a resilient rim. In one embodiment, side-by-side devices are embraced between the base and the button. In another embodiment, one device is embraced between the base and the button, and the base has a superstructure for engaging the other device.

40 Claims, 6 Drawing Sheets

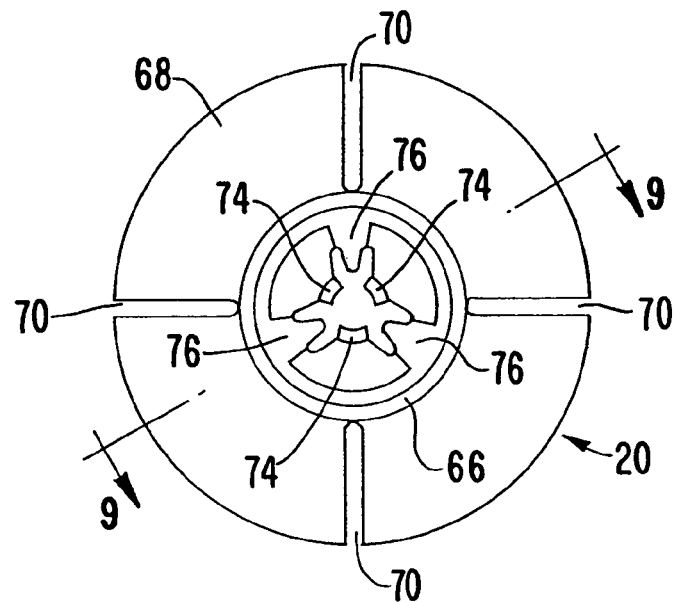
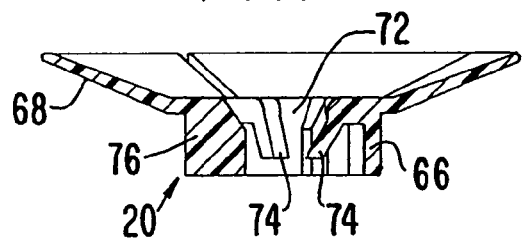
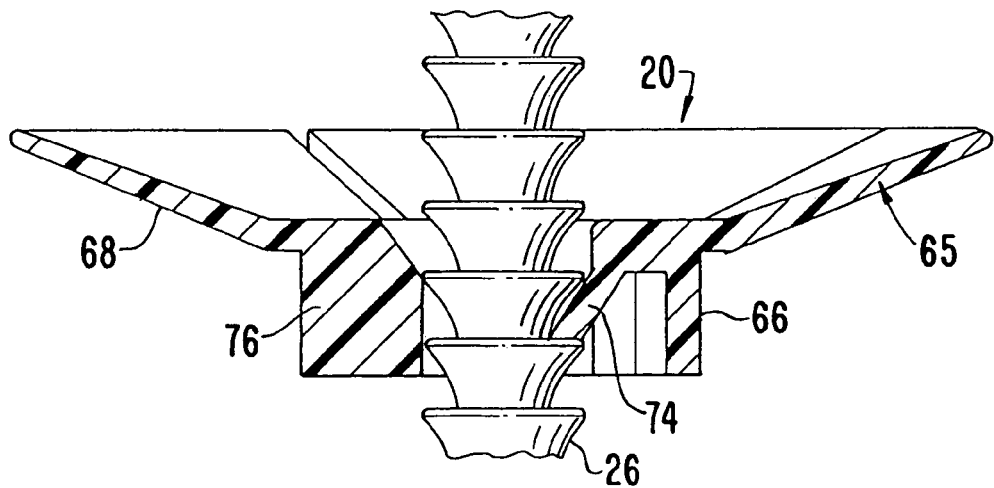

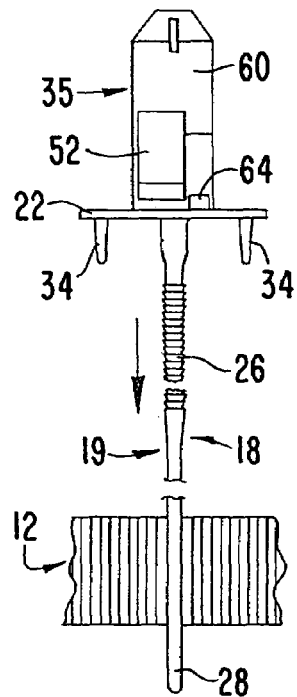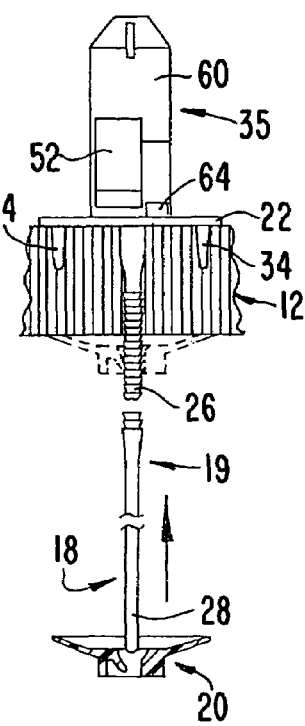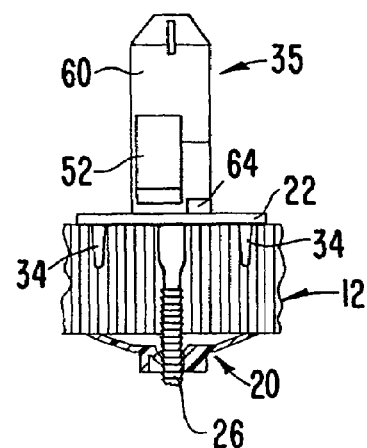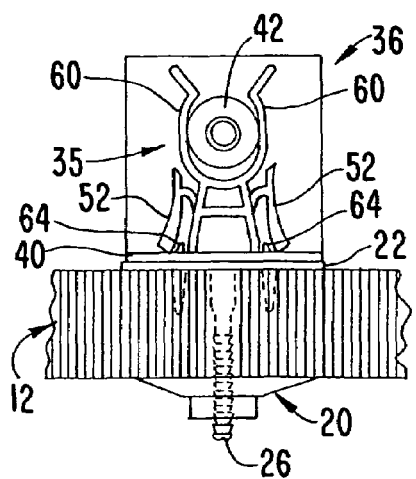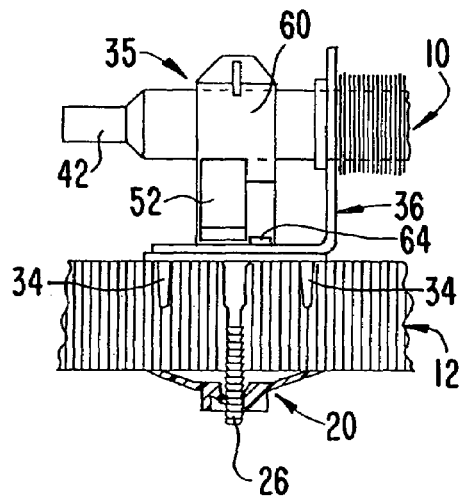

US 7,059,392 B2

RADIATOR ATTACHMENT ASSEMBLIES, APPARATUS COMPONENTS, AND METHODS

CROSS-REFERENCE TO RELATED APPLICATION

This application claims the benefit of provisional application 60/486,175 filed Jul. 11, 2003, incorporated herein by reference.

BACKGROUND OF THE INVENTION

This invention is concerned with the mounting of a first device on a second device, and more particularly with the mounting of a first radiator on a second radiator. Although the invention will be described in its application to radiator mounting, it will become apparent that the invention is not limited to that application.

In regard, particularly, to radiator mounting, the invention is concerned with attaching a small radiator (e.g., a radiator for power steering fluid, automatic transmission fluid, or air conditioning refrigerant) to a larger radiator such as an engine radiator. Two versions of the invention will be described, namely, a serviceable version in which the small radiator is removably attached to the large radiator, and a non-serviceable version in which the small radiator is permanently attached to the large radiator. Each version comprises a retainer and a cooperable button.

A prior art non-serviceable radiator attachment apparatus also comprises a retainer and a cooperable button. The retainer comprises a flange and a stem with a ratchet that projects from the flange. The radiators are arranged side-by-side. The stem is passed through openings in the small radiator and the large radiator until the flange of the retainer abuts one side of the small radiator and the ratchet projects from an opposite side of the large radiator. The button has a hole for receiving the stem, and the button is pressed onto the stem until it abuts the large radiator. Locking elements in the button engage ratchet teeth of the stem so as to mount the small radiator on the large radiator, with the radiators embraced between the flange of the retainer and the button. In the prior art retainer apparatus, the button is comprised of two pieces, namely, a rigid disk having a hole in the center and an annulus that is inserted in the hole and that engages the teeth of the ratchet stem. A prior art serviceable apparatus has a radiator-locking feature pre-molded to a plastic frame of an engine-cooling radiator.

BRIEF DESCRIPTION OF THE INVENTION

The present invention is an improvement upon the prior art. In a preferred embodiment, the button is a single piece with integral tabs that flex when they engage an opposed surface of a radiator, for example. In a serviceable embodiment, the flange or base plate of the retainer has a superstructure that is constructed to pass through a hole in a mounting bracket at one end of the small radiator. The superstructure has elements that releasably latch the base plate to the mounting bracket and elements that releasably embrace a pipe at an end of the small radiator. The superstructure is constructed so that the small radiator can be removed from the retainer for service or replacement. A non-serviceable embodiment of the invention employs the same button, but the flange of the retainer has no superstructure.

BRIEF DESCRIPTION OF THE DRAWINGS

The invention will be further described in conjunction with the accompanying drawings, which illustrate preferred (best mode) embodiments of the invention, and wherein:

FIG. 8 is a plan view showing an opposite side of the button shown in FIG. 7;

FIG. 9 is a sectional view taken along line 9—9 in FIG. 8;

FIG. 10 is a fragmentary sectional view showing the button engaged with teeth of the ratchet on the stem;

FIG. 11 is a fragmentary plan view showing a serviceable embodiment of the invention, with a retainer about to be attached to a large radiator;

FIG. 12 is a fragmentary plan view showing the retainer of FIG. 11 mounted on the radiator and showing the button about to be inserted on the stem;

FIG. 13 is a fragmentary plan view showing a serviceable embodiment of the invention attached to the large radiator;

FIG. 14 is a fragmentary plan view turned 90° from the view in FIG. 13 and showing the superstructure of the apparatus attached to a bracket at an end of a small radiator and engaged with a pipe at the end of the small radiator; and FIG. 15 is a fragmentary plan view similar to FIG. 14 but turned 90° about the axis of the stem so that the apparatus of the invention assumes the position shown in FIG. 13.

DETAILED DESCRIPTION OF THE INVENTION

Figure 1:
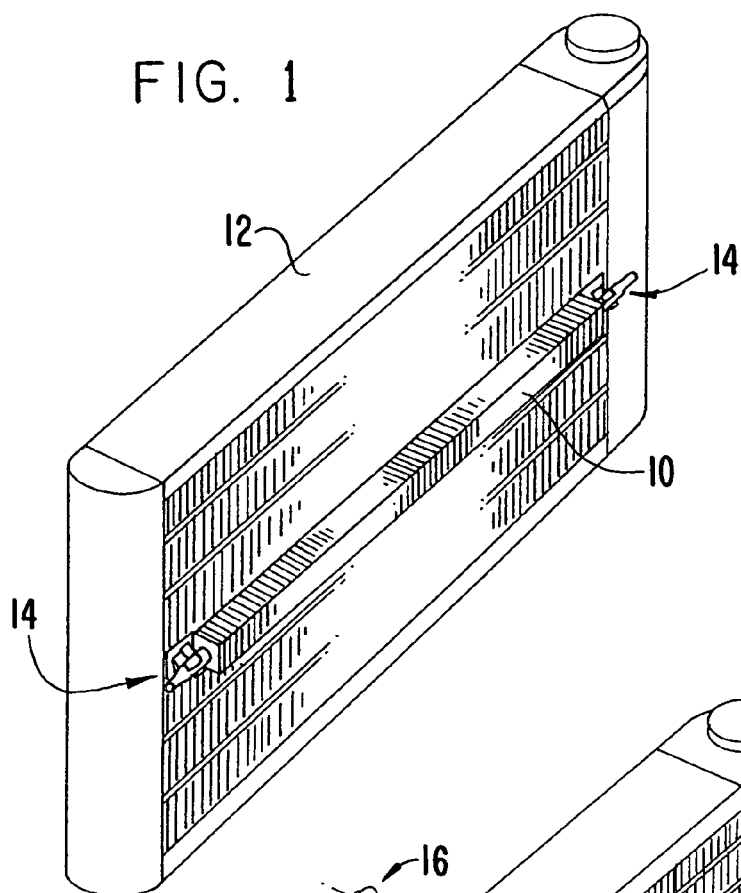
FIG. 1 is a perspective view showing a serviceable embodiment of the invention in which a small radiator is releasably attached to a large radiator.

FIG. 1 shows a small radiator 10 attached to a large radiator 12 using a serviceable embodiment of the apparatus of the invention. The terms "small" and "large" are not intended to be limiting but are used, for convenience, to describe a typical application of the invention in which a small radiator for cooling power steering fluid, automatic transmission fluid, or air conditioning refrigerant, for example, is attached to a large radiator for cooling an engine of a vehicle, for example. The large radiator may also be referred to as a main radiator, and the small radiator may also be referred to as an auxiliary radiator, for example. The size of the radiators is irrelevant.

Figure 2:
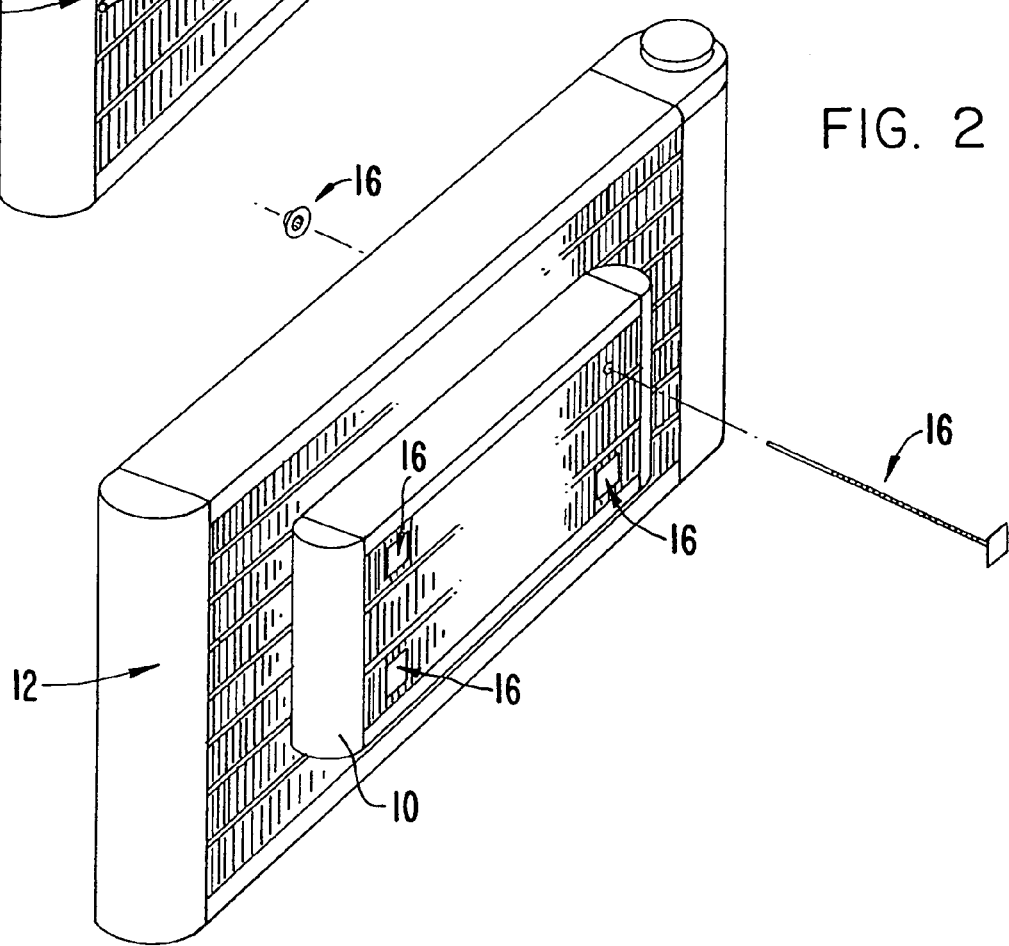
FIG. 2 is a perspective view showing a non-serviceable embodiment of the invention in which a small radiator is permanently attached to a large radiator.

In FIG. 1, the small radiator 10 is attached to the large radiator 12 by an apparatus or assembly 14 of the invention at each end of the small radiator. In FIG. 2, the small radiator 10 is attached to the large radiator 12 by an apparatus or assembly 16 of the invention adjacent to each of four corners of the small radiator. The apparatus or assembly of the invention may be used in as many multiples as desired.

Figure 3:
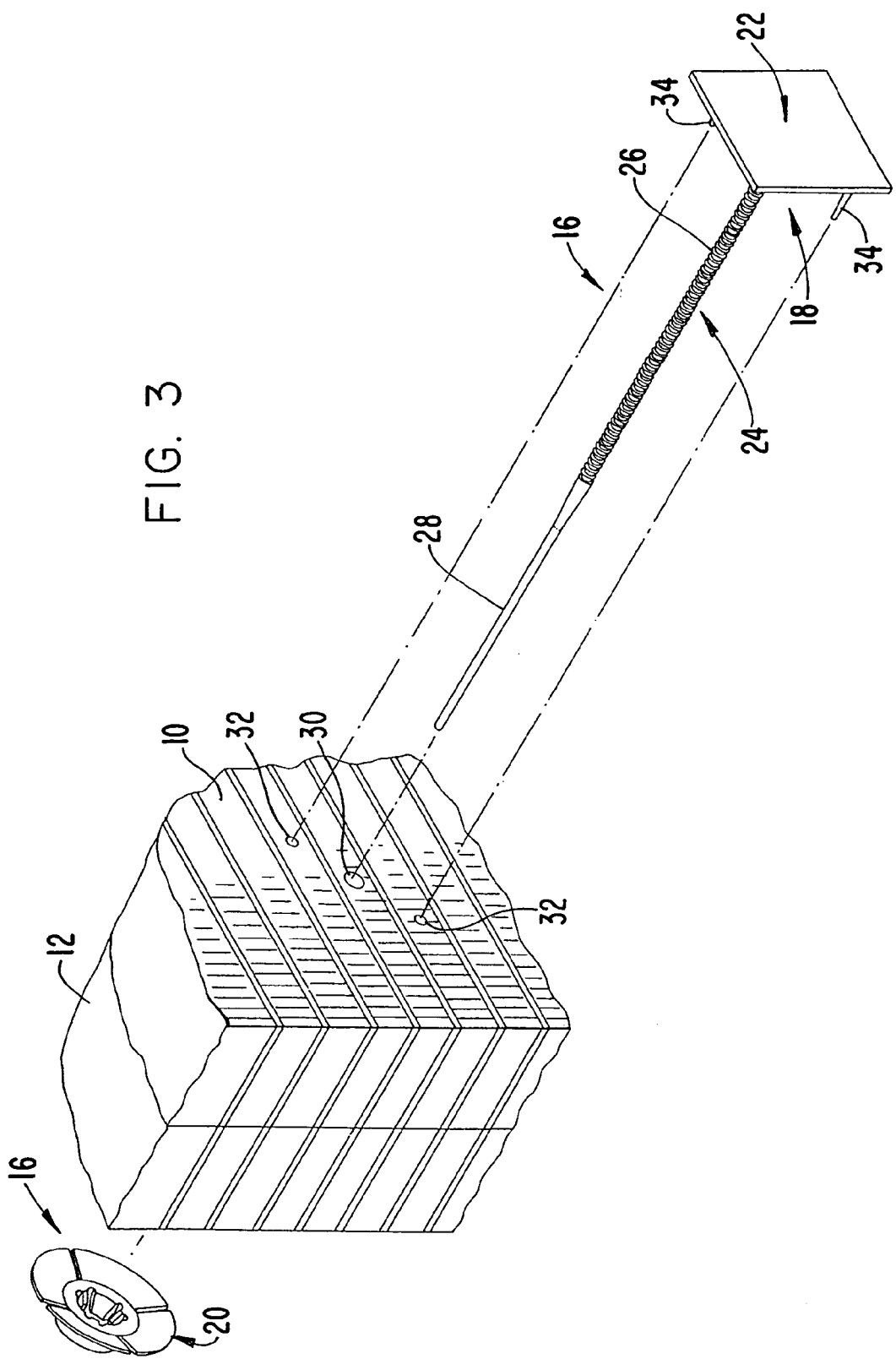
FIG. 3 is a fragmentary perspective view showing a non-serviceable embodiment of the invention about to be used in the attachment of a small radiator to a large radiator.

FIG. 3 illustrates a non-serviceable embodiment of the invention in which the apparatus or assembly 16 of the invention comprises a retainer 18 and a cooperable button 20. The retainer comprises a flange or base plate 22 from which projects a stem 24 having an elongated ratchet 26 adjacent to the base plate and an elongated smooth lead-in or nose-piece 28 remote from the base plate. Preformed holes 30 are formed in the small radiator 10 and the large radiator 12, through which the stem is inserted. Preformed holes 32 are also formed in the small radiator for receiving one or more anti-rotation prongs 34 projecting from the base plate in the same direction as the stem. In FIG. 3, the button 20 is shown at the side of the large radiator opposite to the small radiator, ready to be pressed onto the stem, which will project from the large radiator when the base plate abuts the small radiator. The length of the stem can accommodate various radiator thicknesses.

Figure 4:
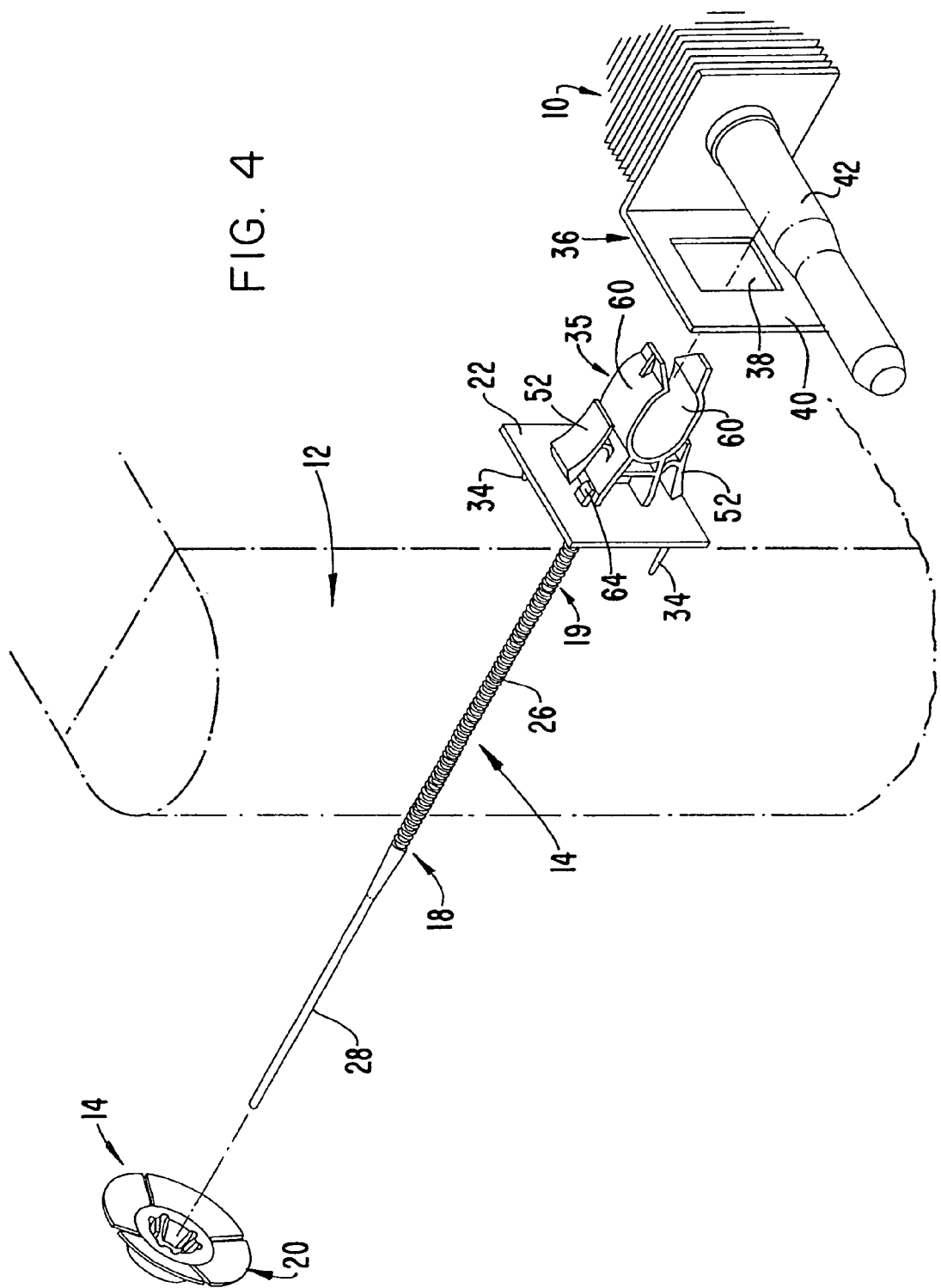
FIG. 4 is a fragmentary perspective view showing a serviceable embodiment of the invention in which a small radiator is about to be attached to a large radiator (shown in phantom)

FIG. 4 shows a serviceable embodiment of the invention, in which the apparatus or assembly 14 of the invention comprises a retainer 19 and a cooperable button 20. The base plate 22, shown in abutment with the main radiator 12, has a superstructure 35 for engaging one end of the small radiator 10. The small radiator has an angle bracket 36 at its end constituting a mounting part, with a rectangular hole 38 in one leg 40 of the angle bracket, through which the superstructure 35 of the retainer is inserted for releasably latching the superstructure to the angle bracket and for releasably clamping a portion of the superstructure to a pipe 42 projecting from the end of the small radiator. A similar arrangement, using another apparatus or assembly 14 of the invention shown in FIG. 4, can be used at the opposite end of the radiators (not shown). In FIG. 4 the button is shown ready to be slipped onto the stem 18 of the retainer, which is identical to the stem of the non-serviceable embodiment shown in FIG. 3.

Figure 5:
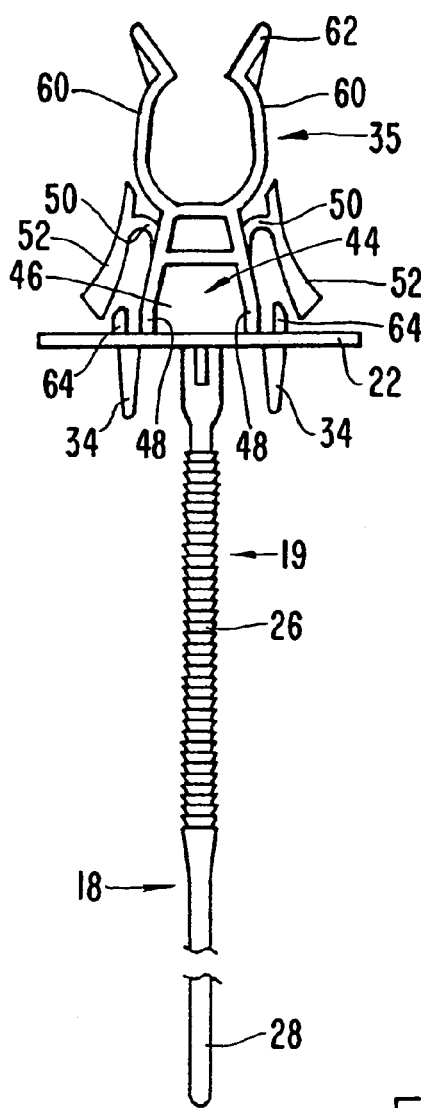
FIG. 5 is a plan view of a retainer of a serviceable embodiment of the invention.
Figure 6:
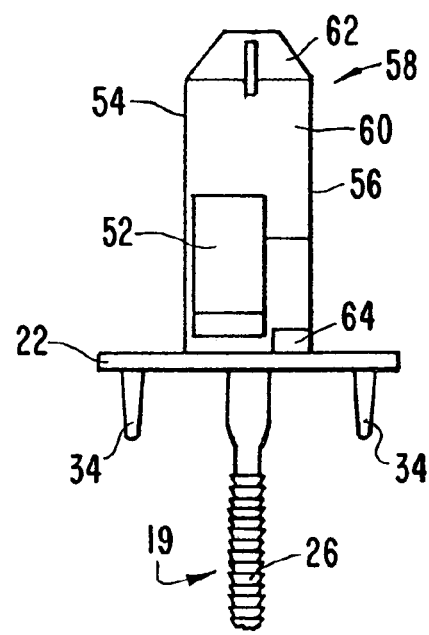
FIG. 6 is a plan view of the retainer of FIG. 5 turned 90° about the axis of the stem, which is shown truncated.

FIGS. 5 and 6 show details of the retainer 19 in accordance with a serviceable embodiment of the invention. Except for the superstructure 35, the retainer of the non-serviceable embodiment is similar.

As shown in FIGS. 5 and 6, the superstructure 35 comprises a main central part 44 which resembles an A-frame with an interior medial stiffening wall 46. Mounted on opposite legs 48 of the central part, by arcuate flexible hinges 50, are a pair of curved resilient wings 52. As shown in FIG. 6, one of the wings is close to one side 54 of the superstructure, and although not shown in FIG. 6, the other wing is close to the opposite side 56 of the superstructure.

A portion of the superstructure remote from the base plate 22 comprises a U-shaped clamp 58, the resilient legs 60 of which have diverging tips 62. Projecting from the superstructure side of the base plate are one or more ribs 64. As shown in FIG. 6, one of a pair of ribs is adjacent to one side 56 of the superstructure, and although not shown in FIG. 6, the other rib is adjacent to the opposite side 54 of the superstructure.

Figure 7:
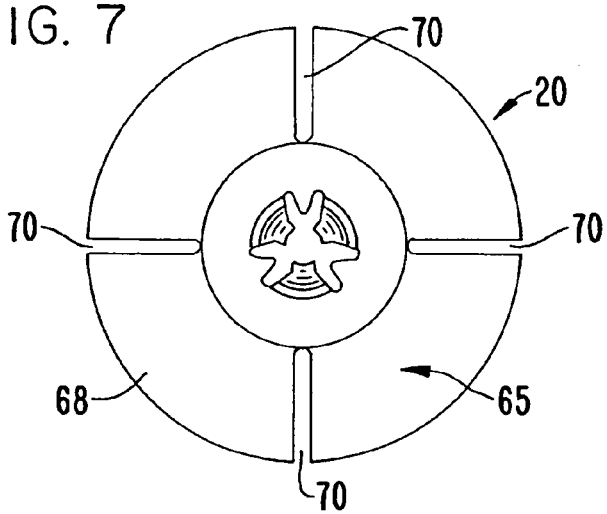
FIG. 7 is a plan view showing one side of a button in accordance with the invention.

As shown in FIGS. 7–9, the button 20 comprises a cupped disk 65 with a central portion forming a hub 66, and a resilient rim 68 divided by slots 70 into four flexible sector tabs that project outwardly and axially from the hub. The hub has a central axial opening 72 for receiving the stem of the retainer. Three pawls or locking fingers 74 spaced 120° apart about the axis of the button project into the central opening for engagement with the ratchet teeth of the stem of the retainer. Three support ribs 76 interdigitated with the pawls project inwardly of the hub to protect the locking fingers from disengagement during side-loading. The support ribs center the stem inside the button. Depending upon the needs of a particular embodiment, the number of pawls and ribs can vary. The flexing tabs of the button accommodate variation between the location of the closest ratchet tooth on the stem and the adjacent side of the radiator, allowing for take-up in the thickness of the radiator and keeping the assembly of the button and the retainer snugly in place.

FIGS. 11–15 illustrate the manner in which components of a serviceable embodiment of the invention are used as an apparatus or assembly to attach an end of a small radiator to a large radiator.

As shown in FIG. 11, the stem 18 of the retainer 19 is inserted through a hole in the large radiator 12 until, as shown in FIG. 12, the base plate 22 abuts one side of the large radiator, with the anti-rotation prongs 34 inserted in corresponding holes in the large radiator.

Then, the button 20 is slipped over the nose-piece 28 of the stem of the retainer and is pressed onto the ratchet 26 of the stem so that the pawls 74 of the button engage teeth of the ratchet, as shown in FIG. 10. When the button abuts the side of the large radiator opposite to the base plate, the sector tabs of the rim 68 of the button flex resiliently. The portion of the stem projecting beyond the button can then be trimmed as shown in FIG. 13. In a preferred embodiment, the engagement of the pawls of the button with the teeth of the ratchet is a one-way engagement, preventing removal of the button from the retainer.

As shown in FIG. 4, the superstructure 35 of the retainer is inserted through the rectangular hole 38 in leg 40 of the angle bracket attached to one end of the small radiator 10. During this insertion, the wings 52 of the superstructure flex so as to compress resiliently, and then they expand so as to snap into positions with tips of the wings engaging the leg 40 of the angle bracket around the hole 38. The ribs 64 enter the hole and engage opposite edges of the wall of the hole for lateral stabilization of the superstructure relative to the angle bracket. The ribs 64 provide side-load protection and prevent disengagement of the superstructure caused by over-flexing of the wings 52 in side (shear) loading. The legs 60 of the U-shaped clamp 58 flex resiliently as the clamp opens to receive the pipe 42 and then to embrace the pipe, as shown in FIGS. 14 and 15.

When it is desired to remove the small radiator for service or replacement, the wings 52 are pressed toward one another so that they can pass through the hole 38 as the angle bracket is pulled away from the large radiator, and the legs 60 of the U-shaped clamp 58 flex to permit the pipe 42 to be removed from the clamp.

In the non-serviceable embodiment shown in FIG. 3, after the flange 22 of the retainer has been pressed into abutment with one side of the small radiator and the button has been slipped onto the projecting stem of the retainer and abutted with the opposite of the large radiator, the portion of the stem projecting beyond the button can be trimmed as in the serviceable embodiment. It will be apparent that the arrangement of the radiators shown in FIGS. 2 and 3 can be reversed so that the flange of the retainer abuts one side of the large radiator and the button abuts the opposite side of the small radiator.

The invention is not limited to the mounting of a single small radiator and a large radiator. It is apparent that a plurality of small radiators may be mounted on a large radiator using the apparatus of the invention in as many multiples as required. The serviceable and non-serviceable versions of the invention may be used together to mount different small radiators on a large radiator.

In all of the embodiments of the invention, it is preferred that both the retainers and the buttons be manufactured of a plastic such as nylon by molding, so that each retainer is a single piece of molded plastic, and each button is a single piece of molded plastic.

While preferred embodiments of the invention have been shown and described, it will be apparent that changes can be made without departing from the principles and the spirit of the invention, the scope of which is defined in the accompanying claims. For example, although the base of the retainer and the rim of the button have been described as abutting certain sides of the devices, it is evident that such abutting need not require direct contact and is intended to include circumstances in which an intermediate member may be inserted between the base of the retainer and a side of a device and/or between the rim of the button and a side of a device.

What is claimed is:

1. An assembly comprising:
a retainer; and
a cooperable button,
wherein the retainer has a base from which projects a stem with a ratchet thereon,
wherein the button has a hub with an axial opening for receiving the stem, at least one pawl tar engaging the ratchet, and a plurality of resilient tabs projecting outwardly and, axially from the hub, and
wherein the button is constructed so that when the axial opening of the hub receives the stem in a predetermined direction, the at least one pawl is oriented to engage the ratchet in an orientation that latches the at least one pawl to the ratchet and the resilient tabs project axially toward the base of the retainer.

2. An assembly according to claim 1, wherein the base is a plate and the ratchet is an elongated portion of the stem between the plate and a smooth lead-in portion of the stem.

3. An assembly according to claim 1, wherein the base has at least one anti-rotation prong projecting therefrom in a same direction as the stem.

4. An assembly according to claim 1, wherein the base has a superstructure thereon at a side of the base opposite to a side from which the stem projects, the superstructure being constructed to attach a mounting part of a device to the base.

5. An assembly according to claim 4, wherein the superstructure is constructed to pass through an opening in the mounting part and has a resilient clamp for engaging and holding an element of the first device.

6. An assembly according to claim 5, wherein the superstructure has resilient wings for engaging the mounting part of the first device after passing through the opening in the mounting part.

7. An assembly according to claim 6, wherein the superstructure has at least one rib adjacent to the wings.

8. An assembly according to claim 5, wherein the clamp is U-shaped with resilient arms having diverging tips.

9. An assembly according to claim 4, wherein each of the retainer and the button is a single molded piece.

10. Apparatus in which a first device is attached to a second device arranged side-by-side with the first device, comprising:
a retainer; and
a cooperable button,
wherein the retainer has a base from which projects a stem with an elongated ratchet, the button has a hub with an axial opening and resilient tabs projecting outwardly and axially from the hub,
wherein the stem of the retainer extends through the first device and then through the second device, the base of the retainer abuts one side of the first device and the ratchet projects from an opposite side of the second device and through the axial opening of the button, and the tabs of the button abut the opposite side of the second device.

11. Apparatus according to claim 10, wherein the devices are first and second radiators.

12. Apparatus in which a first device is mounted on a second device using a retainer and a coaperable button, wherein:
the retainer has a base that abuts one side of the second device and has a stem projecting from one side of the base and extending through the second device, and the stem has an elongated ratchet projecting from the opposite side of the second device,
wherein the button has a hub with an axial opening into which the elongated ratchet extends and has resilient tabs projecting from the hub outwardly and axially and engaging the opposite side of the second device, and
wherein the retainer has a superstructure projecting from the opposite side of the base and engaging a mounting part of the first device.

13. Apparatus according to claim 12, wherein the mounting part of the first device is a mounting plate with an opening through which the superstructure of the retainer projects.

14. Apparatus according to claim 13, wherein the mounting plate has one side thereof juxtaposed with the base, and the superstructure has resilient wings that pass through the plate opening and engage the opposite side of the mounting plate adjacent to the plate opening.

15. Apparatus according to claim 14, wherein the superstructure has a releasable clamp that passes through the plate opening and clamps an element of the first device.

16. Apparatus according to claim 15, wherein the devices are first and seond radiators, the base has at least one anti-rotation prong extending into the second radiator, and the element clamped by the releasable clamp is a tube extending from the first radiator.

17. Apparatus according to claim 13, wherein the base has at least one rib projecting therefrom into the plate opening to stabilize the superstructure which respect to the mounting plate.

18. A retainer for use with a cooperable button for mounting a first device on a second device, comprising:
a base having a stem projecting from one side of the base, the stem having an elongated ratchet thereon for engaging at least one pawl of the button and having a superstructure at the opposite side of the base, and
wherein the superstructure is constructed to engage and hold a mounting part of the first device so that the first device can be mounted on the second device embraced between the base and the button.

19. A retainer according to claim 18, wherein the superstructure has a releasable clamp for engaging and holding an element of the first device.

20. A retainer according to claim 19, wherein the clamp is U-shaped with resilient arms having diverging tips to facilitate entry of the element of the first device into the clamp.

21. A retainer according to claim 18, wherein the superstructure has resilient wings for engaging the mounting part of the first device at opposite sides of an opening in the mounting part through which the superstructure is passed.

22. A retainer according to claim 21, wherein the base has at least one rib to enter the opening in the mounting part and stabilize the superstructure which respect to the mounting part.

23. A retainer according to claim 18, wherein the elongated ratchet is located between the base and a smooth lead-in portion of the stem.

24. A retainer according to claim 18, wherein the base has at least one anti-rotation prong projecting from the base in a same direction as the stem.

25. A one-piece molded plastic button for engagement with a retainer having a base from which projects a ratchet on a stem, comprising:
 a hub having an axial opening to receive the stem and at least one pawl oriented to engage the ratchet to latch the pawl to the ratchet when the stem is received in the opening in a predetermined direction; and
 a plurality of resilient tabs projecting outwardly and axially from the hub and disposed to extend toward the base when the stem is received in the opening in the predetermined direction.

26. A button according to claim 25, wherein the tabs are sections of a rim of the button that is divided to define the tabs.

27. A button according to claim 26, wherein the button defines a cupped disk that includes the hub and the rim.

28. A button according to claim 25, wherein there are a plurality of pawls interdigitated with a plurality of centering ribs spaced about the circumference of the axial opening in the hub.

29. A method of mounting a first device on a second device, comprising:
 providing a retainer and a cooperable button, the retainer having a base from one side of which projects a stem with an elongated ratchet, the button having a hub with an axial opening with at least one pawl therein and a resilient rim divided into tabs that project outwardly and axially from the hub;
 arranging the devices side-by-side;
 passing the stem of the retainer through the devices until the base abuts one side of the first device and the ratchet of the stem projects from the opposite side of the second device; and
 placing the button on the stem so that the sem enters the axial opening of the hub to engage the at least one pawl with the ratchet and to abut the resilient rim of the button with the opposite side of the second device.

30. A method according to claim 29, wherein the devices are first and second radiators with holes through which the stem is passed.

31. A method according to claim 30, wherein the base has at least one anti-rotation prong projecting therefrom in a same direction as the stem, and the first radiator has at least one hole that receives the at least one prong.

32. A method according to claim 28, wherein the stem has a smooth lead-in portion at an end thereof opposite to the base, and the lead-in portion enters the opening in the button before the at least one pawl of the button engages the ratchet.

33. A method of mounting a first device on a second device, comprising:
 providing a retainer and a cooperable button, the retainer having a base with a stem projecting from one side thereof, the stem having an elongated ratchet, the base of the retainer having a superstructure projecting from a side of the base opposite to the side from which the stem projects, the superstructure being constructed to engage and hold a mounting part of the first device, the button having an axial opening for receiving the stem, the opening having at least one pawl therein for engaging the ratchet;
 passing the stem of the retainer through the second device until the base of the retainer abuts one side of the second device and the ratchet projects from the opposite side of the second device;
 placing the button on the stem so that the at least one pawl engages the ratchet of the stem and the button abuts the opposite side of the second device; and
 engaging the superstructure of the retainer with a mounting part of the first device.

34. A method according to claim 33, wherein the mounting part of the first device has an opening through which the superstructure of the retainer is passed, the superstructure has resilient wings which are compressed as the superstructure passes through the mounting part opening and then expanded about the mounting part opening to retain the superstructure on the mounting part.

35. A method according to claim 34, wherein the superstructure has at least one rib that enters the mounting part opening to stabilize the superstructure relative to the mounting part opening.

36. A method according to claim 33, wherein each of the retainer and the button is formed as a single piece.

37. A method according to claim 33, wherein the devices are first and second radiators, the stem of the retainer is passed through an opening in the second radiator, and the base of the retainer has at least one anti-rotation prong that projects from the base at a same side as the stem and enters a hole in the second radiator.

38. A method according to claim 33, wherein the superstructure of the retainer has a releasable clamp that receives and clamps an element of the first radiator.

39. A method according to claim 38, wherein the element of the first radiator is a tube that is clamped by the clamp when the superstructure is passed through the opening in the mounting part of the first radiator.

40. A one-piece plastic button for engagement with a ratchet on a stem projecting from a base, comprising:
 a central portion having an axial opening to receive the stem, with a plurality of pawls interdigitated with centering ribs in the opening to engage the ratchet and stabilize the button on the stem, the pawls being oriented to latch the pawls to the ratchet when the stem is received in the opening in a predetermined direction; and a resilient rim projecting outwardly from the central portion and toward the base when the stem is received in the opening in the predetermined direction.

\* \* \* \* \*